United States Patent [19]

Gordon

[11] Patent Number: 5,009,193
[45] Date of Patent: Apr. 23, 1991

[54] CIRCULAR CAT TOY

[76] Inventor: Richard A. Gordon, 95 W. 3rd St., Freeport, N.Y. 11520

[21] Appl. No.: 413,162

[22] Filed: Sep. 27, 1989

[51] Int. Cl.$^5$ ...................... A01K 15/02; A63H 33/00
[52] U.S. Cl. ......................................... 119/29; 446/170
[58] Field of Search ............. 446/170, 168, 419; 119/29, 29.5

[56] References Cited

U.S. PATENT DOCUMENTS

| | | | |
|---|---|---|---|
| 1,534,964 | 4/1925 | Kahnweiler | 119/29.5 |
| 2,086,631 | 7/1937 | Munro | 119/29.5 |
| 3,648,403 | 3/1972 | Gommel | 446/168 X |
| 4,722,299 | 2/1988 | Mohr | 446/170 X |

FOREIGN PATENT DOCUMENTS 499626  2/1954  Canada .................................. 446/170

Primary Examiner—Mickey Yu
Attorney, Agent, or Firm—Bauer & Schaffer

[57] ABSTRACT

A torroidal enclosure defining a circular track having a ball located therein. A plurality of oblong openings are formed on the top and a plurality of portal openings are formed in the side. The openings are offset, uniformly alternating with each other, one of the portal openings being large enough to allow the ball to pass through it.

5 Claims, 2 Drawing Sheets

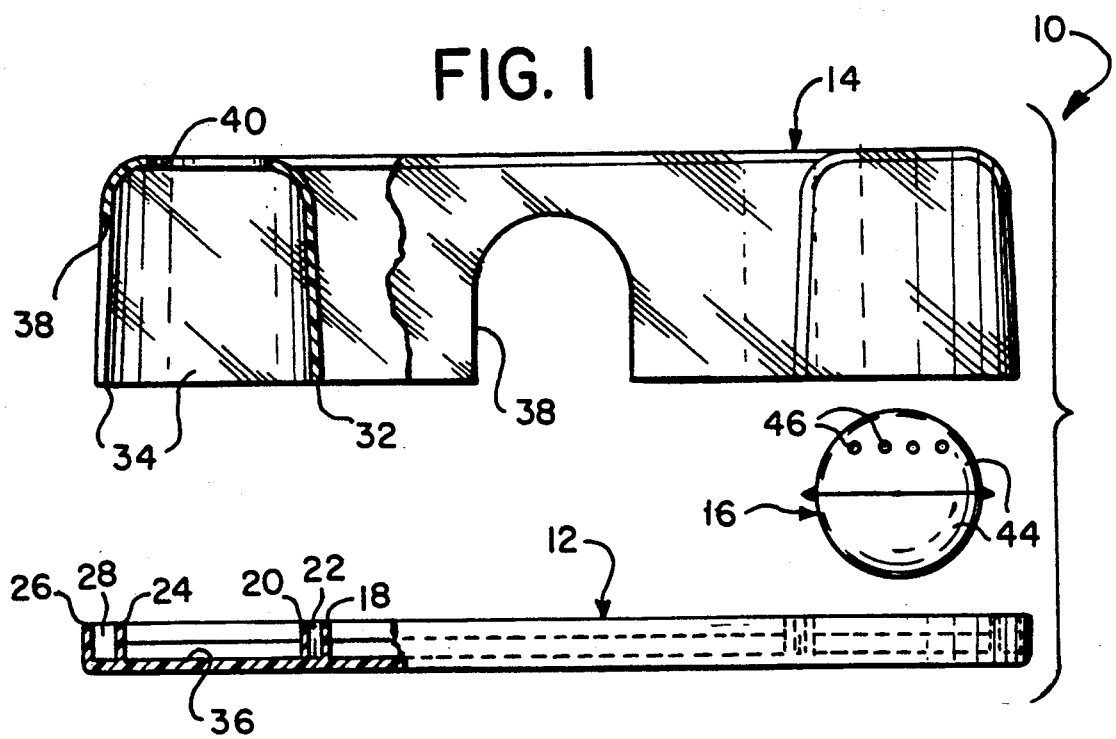
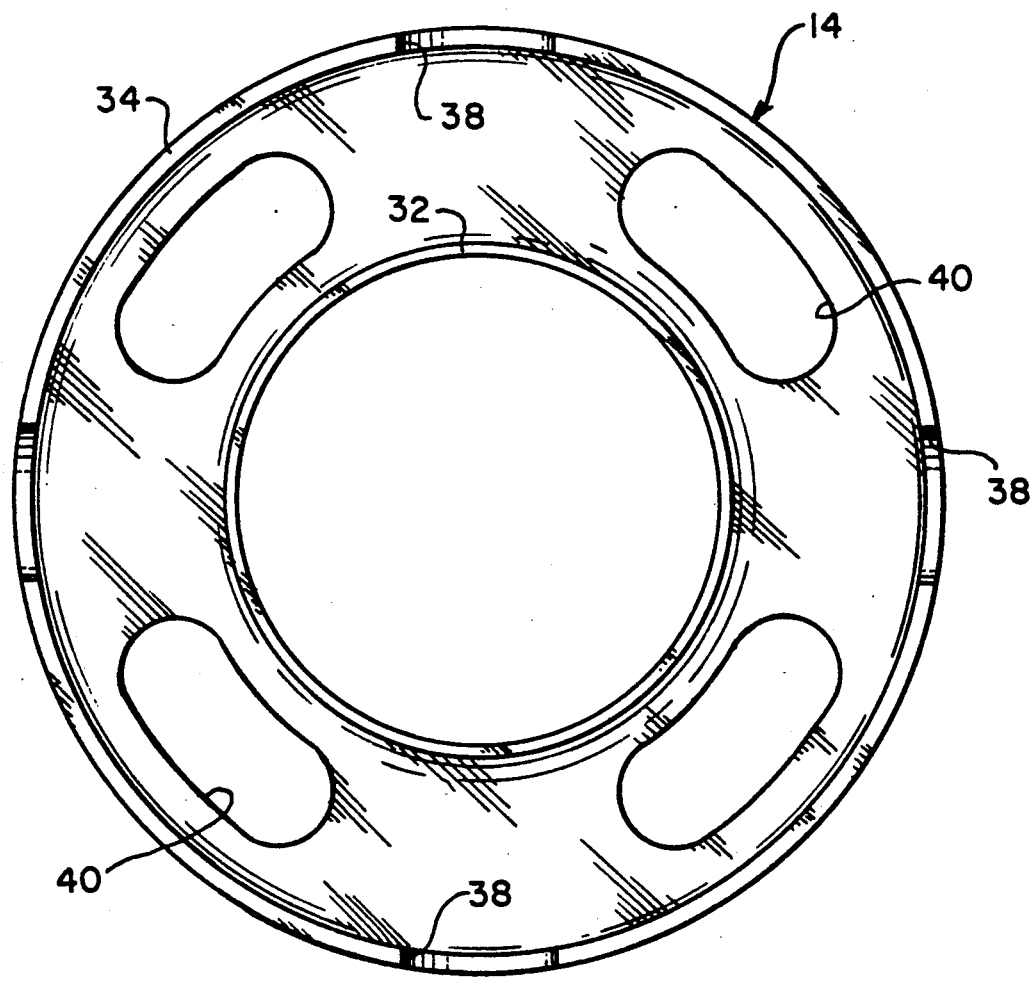

CIRCULAR CAT TOY

The present invention relates to an animal plaything and more particularly, to a toy for cats.

BACKGROUND OF THE INVENTION

A wide variety of pet toys are known, which range from simple, inexpensive structures of limited, useful life to complex expensive stuctures of great usefulness and durability. Nevertheless, there is a lack of good suitable toys for cats. Cats are generally more restrictive in play and while of generally high intelligence, can not be confined in their behavior for repetitive manipulation of toys. Cats, more easily than most animals, tire of specific playthings once they have mastered them and act disdainfully of those that are too simple. Thus, there exists, the need for a pet toy which is simple in structure, yet durable and inexpensive and above all, continually challenging to the animal.

The present invention fulfills such a need.

It is a further object of the present invention to provide a toy which is colorful, dynamic and physically challenging to a cat.

These objects, together with other objects and advantages, will be found in the disclosure of the present invention as set forth hereinafter.

BRIEF STATEMENT OF THE INVENTION

In accordance with the present invention, there is provided a plaything for cats which combines the dynamic of a chase, with the physical as well as intellectual activity of the animal. Briefly the plaything comprises an enclosure defining a track having a prey located therein and openings or apertures in its walls permitting the animal to insert its paws to engage the prey. As used herein, the term prey defines an object which attracts the animal.

In particular, the enclosure defines a torroidal course comprising a flat bottom member, which rests on the floor, upon which is mounted a plastic ring, of U-shaped cross section, having an array of holes formed on its upper and side walls. A ball is located in the course and the cat is required to manipulate the ball through the course by inserting a paw within a hole and slapping the ball. At least one of the holes is larger than the ball being used allowing the cat eventual satisfaction in capturing the ball. Preferably the ball is a lightweight hollow porous sphere containing some attracting substance such as catnip, which can also be removed for refilling.

Full details of the present invention are set forth in the following description.

THE DRAWINGS

In order to describe the inventive cat toy more fully, reference is directed to the accompanying drawings which are to be taken in conjunction with the following description thereof and in which drawings:

FIG. 1 is an exploded and partially sectioned view of the cat toy according to the present invention;

FIG. 2 is a top plan view of the cat toy shown in FIG. 1;

DESCRIPTION OF THE PREFERRED EMBODIMENTS

Figure 3:
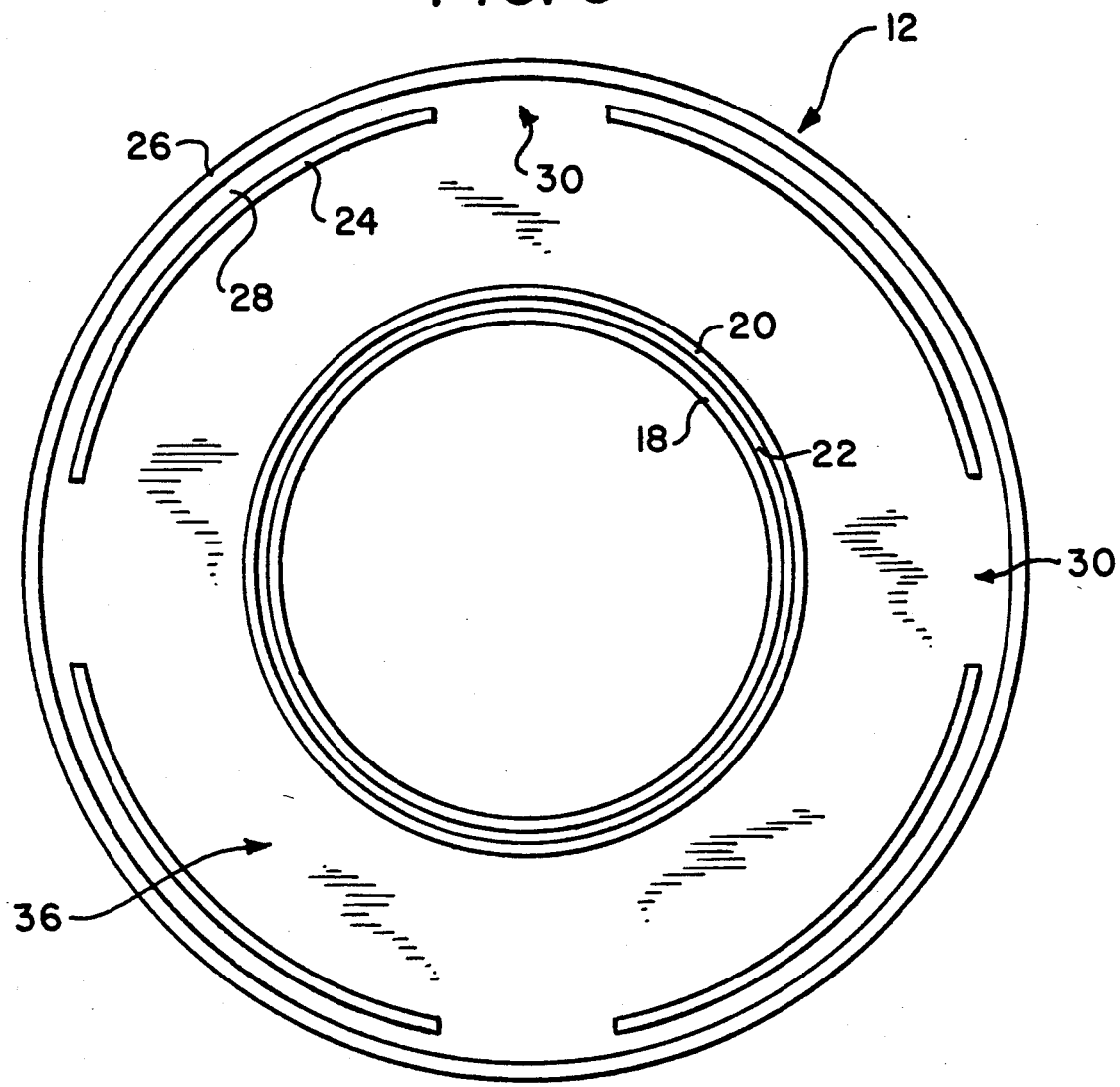
FIG. 3 is a plan view of the bottom member of a pet toy.

Referring to FIG. 1, the toy according to the present invention, conveniently takes the form of torroidal enclosure, adapted to rest with its central axis perpendicular to the compartment. The enclosure, depicted by the number 10 formed of flat or planar ring-shaped bottom member 12, a mating annular cover member 14 having a U-shaped shaped cross section, and a prey 16 located therebetween. The bottom member 12 may be formed of metal, composition board, plastic or the like and is semi-rigid in nature. Preferably the bottom member 12 is molded from any suitable known plastic, such as polyethylene, polystyrene, polyamide, polyester and polyurethane plastics and is semi-rigid in nature. The cover member 14 is made of clear transparent plastic materials of any of the types disclosed.

The inner periphery of the bottom member 12 is defined by a pair of upwardly extending continuous ridges 18 and 20 concentrically spaced from each other to form an annular slot 22 therearound. The outer periphery of the bottom member 12 is similarly defined by a pair of upwardly extending circumferential ridges 24 and 26 spaced to form another slot 28.

For the purpose to be more fully explained later, the ridges 24 and 26 defining the outer periphery are seen in FIG. 3, not continuous, but are broken at regular intervals so as to provide a smooth passage or sill 30 over which the prey 16 may roll outwardly.

The mating cover member 14 is circular, arched, and is provided with a pair of concentric edges 32 and 34 disposed to fit in the slots 22 and 28, at the inner and outer perimeters of the bottom members respectively. Peripheral edges 32 and 34 may be slightly enlarged so that in assembly with bottom member 12, the cover member 14 fits snugly and is frictionally held therein. when the bottom member and the cover are assembled, they form a predefined course or raceway 36 for the prey 16.

The cover member 14 is provided with a plurality of portal openings 38 disposed in its side wall, spaced circumferentially to register with the sills 30. At least one of the openings 38 is (here shown at the 3 o'clock position in FIG. 2) being slightly larger than the others to permit insertion and/or removal of the prey 16 from the raceway. The cover member 14 is also provided with opening 40 its top, which are oblong rather than arched to provide an entry into the enclosure generally directed along the path of the raceway 36. Moreover, if desired, one or more of the openings 40 in the top member may be disposed to lap around the side, although they are preferably disposed near the top of the surface of the cover member 14, as illustrated.

In accordance with the present invention, both the cover and bottom members may be made from clear plastic although it is preferred that the bottom member be made of a brightly colored plastic, since a bright color will attract a pet's attention. Furthermore, while the freely movable body such as the prey 16, shown in FIG. 5 may be the same color as the bottom member, it is preferrably made of a plastic which is multi-colored and which will stand out from the color of the bottom member.

Although the bottom and cover member 12 and 14 are shown as being ring shaped, having central openings connected to each other by the functional engagement of the ridges and edges, neither the ring shaped form or frictional connection is critical. The cover and bottom members be oval, oblong, rectangular or provided in a three dimensional path, such as a loop, all intended to have a predetermined raceway and they may be connected by other means such as gluing, heat sealing or the like.

Figure 4:
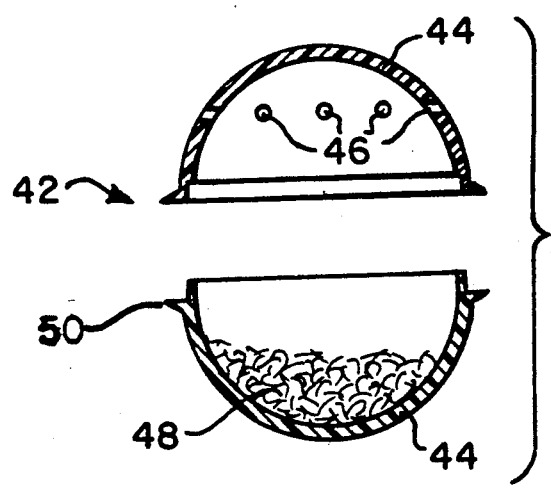
FIG. 4 is a sectional view of the ball member.

As seen in FIG. 4, the prey 16 is made in the form of a pair of a ball 42 consisting of a pair of hollow hemispheres 44 which are sufficiently large so that when attached to each other, the ball cannot freely fall through the openings 38 and 40 in the cover member 14 when the ball is agitated by the animal.

Preferably, one or both hemispheres 44 are made with small pin holes 46 so that when the ball is filled with an attractant such as catnip 48, food flavorings or the like, the scent will escape and attract the animal. Such attractant, combined with bright colors, compels the animal to play with the ball, thus providing it with amusement and physical exercise. The ball on the other hand can be made of sponge or foamed plastic material and impregnated with a solution or extract of an attractant to provide the lure of the animal. Additional small barbs 50 are formed on the surface of the ball 42 so that when moved, the ball will take an erratic course. Of course, the ball may be asymmetrical to achieve a similar erratic movement.

At least one of the openings 38 in the side wall of the cover is shaped to be substantially equal in width to the diameter of the ball so that with only a slight force, it can be squeezed out from the raceway. This permits access to the ball and provides the animal with an achievable goal so he can retrieve the ball. Otherwise, both ball and holes are sized so that the aniumal's paw can be freely inserted in the hole, but the ball cannot fall out.

While the ball is a very suitable prey to be chased by animals, it will be apparent that the prey can be made to enable a small animal or any other figure which will be attacked by the animal. The use of nylon or other highly slippery and slidable material can be used in the event the prey is not intended to roll as a ball.

The toy of this invention presents numerous advantages. For example, it may be made from readily available inexpensive materials of good durability. Moreover, the various members of the toy can be manufactured by known plastic molding process in a straight forward manner due to its simple design and assembly. Numerous other advantages of the toy of this invention, will be readily apparent to those skilled in the art.

It is to be understood, therefore, that numerous modifications of the toy of this invention may be made without departing from the spirit and scope of the embodiment described herein. Therefore, it is to be understood that this invention is not to be limited to the described embodiments thereof, except as defined in the appended claims.

What is claimed is:

1. An animal plaything comprising a torroidal housing defining an enclosed circular raceway and a hollow ball freely movable in said raceway, said housing having a bottom surface adapted to rest on a planar, substantially horizontal surface, an upper surface, and inner and outer side walls, the inner side wall being continuous, the upper surface being provided with a plurality of substantially oblong openings permitting entry of the animal's paw but preventing passage of the ball therethrough, said oblong opening being sufficiently elongated to permit the animal to manipulate the ball over an extended arc, said outer wall being provided with a plurality of circumferentially spaced portal openings, all but at least one permitting entry of the animal's paw but preventing passage of the ball, said at least one portal opening also permitting passage of said ball for its removal, said ball being porous and being filled with an attractive lure for the animal, said oblong openings and portal openings being arranged in uniformly-spaced, alternating position about the center of said torroidal housing to permit said animal to manipulate said ball from opening to opening and cause its removal from only said at least one portal opening through entry of its paw in a selected one of the adjacent oblong openings.

2. The plaything according to claim 1, wherein said housing comprises a planar bottom member and a cover member separable from each other, said bottom member having a circular central opening, a pair of upwardly extending continuous ridges disposed around the periphery of said central opening forming a continous slot therearound, a pair of upwardly extending ridges disposed around the circumferential outer peripheral edge of said bottom member forming a slot therearound, said cover member having an arched cross-section and inner and outer peripheral edges frictionally fitted in the slots of said bottom member and when so assembled, forming the circular raceway.

3. The plaything according to claim 2, wherein the ridges in the bottom member disposed around the circumferential outer periphery of the bottom member are discontinous in conformity with the portal openings in the side wall.

4. The plaything according to claim 2, wherein the bottom member is made of colored plastic, the cover member is made of clear plastic and the ball is made of a different colored plastic than the bottom member.

5. The plaything according to claim 2, wherein the bottom and cover members are made of clear plastic and the ball is made of colored plastic.

* * * * *